United States Patent [19]

Mickunas

[11] Patent Number: 5,040,113

[45] Date of Patent: Aug. 13, 1991

[54] DATA MANIPULATION PROGRAM

[76] Inventor: Marshall D. Mickunas, 1104 Eliot Dr., Urbana, Ill. 61801

[21] Appl. No.: 473,091

[22] Filed: Jan. 31, 1990

Related U.S. Application Data

[63] Continuation of Ser. No. 7,520, Jan. 28, 1987, abandoned.

[51] Int. Cl.[5] .............................................. G06F 15/38
[52] U.S. Cl. .................................... 364/419; 364/900; 364/920.4
[58] Field of Search ........ 364/200, 900, 200 MS File, 364/900 MS File, 419

[56] References Cited

U.S. PATENT DOCUMENTS

| | | | |
|---|---|---|---|
| 3,676,351 | 7/1972 | Eastman | 364/200 |
| 3,753,233 | 8/1973 | Cardell, Jr. et al. | 364/900 |
| 4,255,796 | 3/1981 | Gabbe et al. | 364/900 |
| 4,330,845 | 5/1982 | Damerau | 364/900 |
| 4,339,806 | 7/1982 | Yoshida | 364/900 |
| 4,367,537 | 1/1983 | Yoshida | 364/900 |
| 4,433,392 | 2/1984 | Beaver | 364/900 |
| 4,438,505 | 3/1984 | Yanagiuchi et al. | 364/900 |
| 4,453,217 | 6/1984 | Boivie | 364/200 |
| 4,468,728 | 8/1984 | Wang | 364/200 |
| 4,482,981 | 11/1984 | Morimoto et al. | 364/900 |
| 4,499,553 | 2/1985 | Dickinson et al. | 364/900 |
| 4,597,056 | 6/1986 | Washizuka | 364/900 |
| 4,701,847 | 10/1987 | Nichols | 364/200 |
| 4,757,456 | 7/1988 | Benghiat | 364/900 |
| 4,882,703 | 11/1989 | Nicolai | 364/900 |

Primary Examiner—Joseph A. Popek
Assistant Examiner—Rebecca L. Rudolph
Attorney, Agent, or Firm—Christensen, O'Connor, Johnson & Kindness

[57] ABSTRACT

A method of manipulating data comprises the steps of using the contents of a data memory device and data inputted by an operator to extract additional data from the memory device until the operator determines that the device is displaying the data he desires to see. The method also permits the insertion and rearrangement of the data in the memory device.

22 Claims, 1 Drawing Sheet

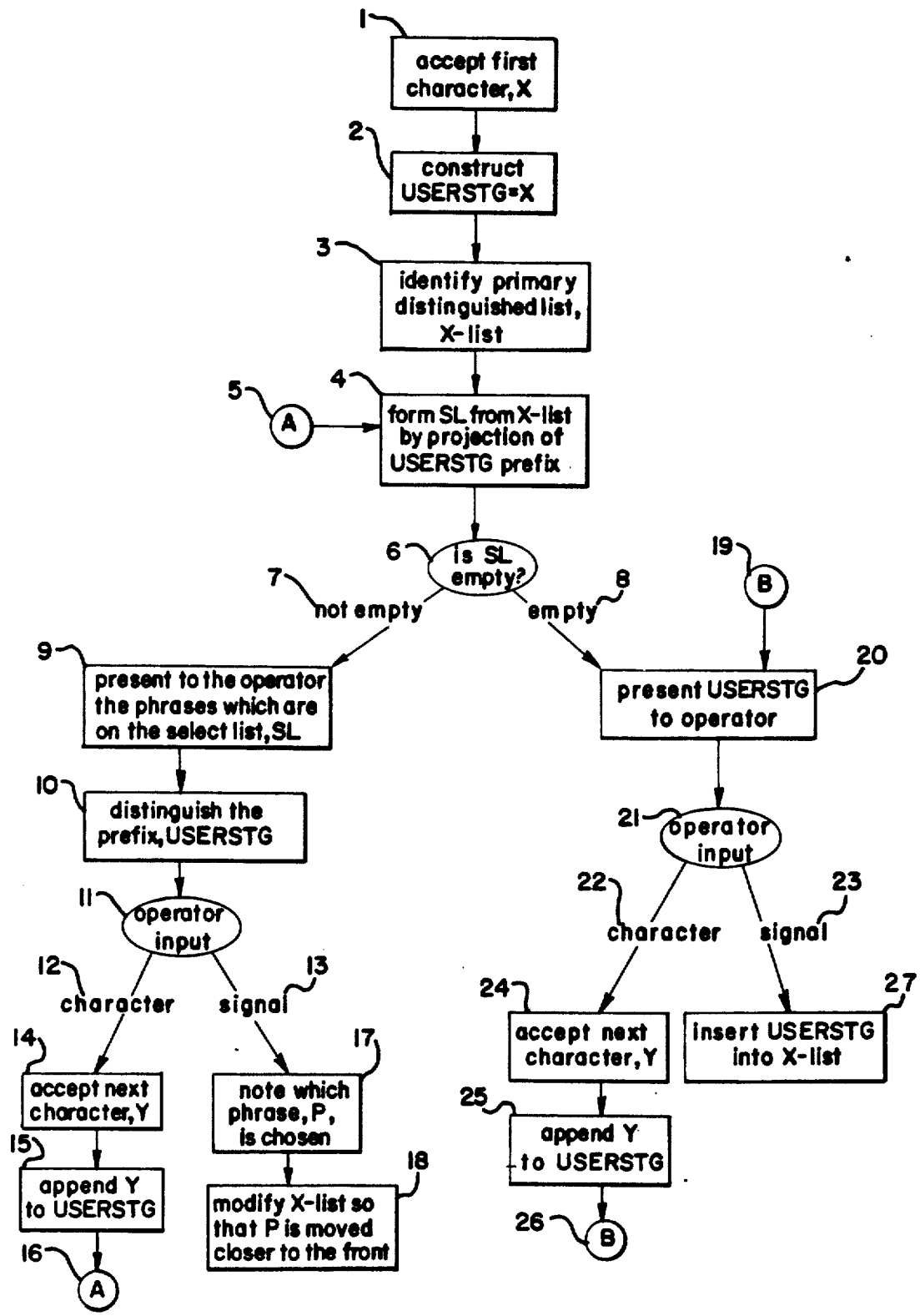

DATA MANIPULATION PROGRAM

This application is a continuation application based on prior copending application Ser. No. 07/007,520, filed on Jan. 28, 1987 abandoned.

BACKGROUND OF THE INVENTION

This invention generally relates to a method of programming a digital computer for automatically collecting, storing, organizing, and displaying data inputted by an operator.

As those in the art will appreciate, the task of collecting data which is inputted by an operator is one which is often laborious, repetitious, and prone to operator error.

This invention is directed to a unique method of collecting and organizing data, which is then used to assist the operator in subsequently inputting data which is similar to that previously inputted.

Other advantages and objects of this invention will be more fully appreciated from the following detailed description and the accompany drawings, of which:

FIG. 1 is a flow chart representing an exemplary overall data processing system and the generalized steps occurring in the normal use of a data processing system employing the process of this invention.

It is to be understood that the figures discussed herein illustrating software flow charts are descriptive of the manner in which the software accomplishes its intended function and that a software programmer skilled in this area would utilize the flow charts to generate appropriate source codes.

There are three distinct organizational types of data that are referred to in the figures. The first type of data is the character type, which is described below. The second type of data is the string type, which, in the present document, is also called the phrase type, and described below. The third type of data is the list type, which is described below.

A character is the collection of data associated with operator input (e.g. the character "b" or the character "&").

A string is a sequence of one or more characters (e.g. the string "dog"). In a string the individual characters are ordered as are the natural numbers. Thus the string "dog" has a length of three, and "d" is the first character of the string, "o" the second, and "g" the third. Note that the blank character ("") has significance in a string; thus the string "old dog" has a length of seven, with its fourth character being the blank character. Those skilled in the art will readily appreciate that there are numerous mechanisms by which strings may be constructed and manipulated. In one construction mechanism, a string of length one is constructed by supplying the single character which comprises the string. In another construction mechanism, a single character is appended to an existing string of length n, thereby constructing a new string of length n+1. This procedure is known as concatenation. In the present invention, the notion of prefix is understood to mean a string whose first and subsequent characters are the same as those of another string. Thus the strings "a", "a", "a d", "a do", and "a dog" are each a prefix of the string "a dog".

In the description of the present invention, the term phrase is used synonymously with the term string. Therefore, our usage of the term phrase reaches beyond the dictionary definition which nominally stipulates "two or more grammatically related words that form a sense unit expressing a thought". Indeed, in the following description, even a nonsensical sequence of one or more characters may be called a phrase.

A list of phrases is merely a sequence of zero or more phrases. For instance, "doll", "cat", "dog days") is a list of phrases. In a list of phrases, the individual phrases are ordered as are the natural numbers. Thus the list of phrases ["doll", "cat", "dog days"] has a length of three, and "doll" is the first phrase in the list, "cat" the second, and "dog days" the third. The first position in a list of phrases is called the front of the list; the last position is called the rear of the list. Note that a list may be comprised of no phrases whatsoever, whence it is said to have a length of zero, or simply to be empty. Those skilled in the art will readily appreciate that there are numerous mechanisms by which lists ma be constructed and manipulated.

For instance, Chapter 4 of *Data Structures with Abstract Data Types and Pascal* by Stubbs and Webre, 1985, published by Brooks/Cole discusses various elementary properties of lists, and the elementary operations which may be performed on lists. Another reference work is *Data Structures in Pascal* by Reingold and Hansen, 1986, published by Little, Brown.

The present invention makes reference to two specific operations which are performed on lists: one for constructing lists, and one for manipulating lists. In the construction mechanism, called projection, a new list is constructed from an existing list by selecting from the existing list exactly those phrases which satisfy some criterion; the new list is constructed so that the relative order of the selected phrases is preserved. For instance, the projection from the list ["doll", "cat", "dog days"] of all phrases having the prefix "do" is the list ["doll", "dog days"]. In the manipulation mechanism that is sometimes performed upon a list, the phrases in the list may be rearranged according to some criterion. Thus, the phrases in a list which are more important or likely to be used may be placed nearer to the front of a list. For instance, the list "doll", "cat", "dog days"] may be rearranged yielding the list "cat", "dog days", "doll"] where "dog days" has moved closer to the front of the list and "doll" has moved closer to the rear of the list.

The figures discussed herein illustrating software flow charts make reference to certain variables which are merely symbolic names which, at any given time, represent any one of a set of values. One skilled in the art of programming will recognize that such a variable corresponds to a specific location in the memory means, and the value represented by such a variable is precisely the data item which is stored at that specific location, and possibly at subsequent locations, in the memory means.

In the figures discussed herein, the variable X represents the data character first inputted by the operator. The variable Y represents the data character most recently inputted by the operator. As one skilled in the art of programming will appreciate, the variable Y is capable of storing only a single data character, so when the operator subsequently inputs yet another data character, that new data character becomes the new value of the variable Y, replacing any previous value. The variable USERSTG represents the phrase formed from the sequence of characters first and subsequently inputted by the operator.

Additionally, the present invention makes reference to a method for distinguishing a list, according to some characteristic that is common to some of or all of the phrases in the list. In particular, the present invention distinguishes a list by the initial character of some of or all the phrases in the list.

All of those phrases which begin with the character "A" are contained in a single list called the "A"-list; all of those phrases which begin with the character "B" are contained in a list, called the "B" list and so on. More generally, if the variable X represents a data character, then all of those phrases which begin with the character that is represented by the variable X are contained in a single list, called the X-list. As those skilled in the art of programming will readily appreciate, it is possible and sometimes advantageous, to "combine" lists. That is, it is possible that a list contains all of those phrases which begin with the character "A" together with all of those phrases which begin with the character "B". Such a list can be ordered so that the more important or more likely used phrases are nearer the front of the list. Such a list has all of the necessary characteristics of the "A" list as well as all of the necessary characteristics of the "B" list. Therefore, such a list is simultaneously the "A" and the "B" list. Indeed, it is possible to combine all of the distinguished lists into a single list; that single list is simultaneously the "A" list and the "B" list, etc.

In the present invention, a plurality of such lists is maintained, corresponding to those characters which the implementor may wish to distinguish. Additionally, combinations of such distinguished lists may be maintained. Consequently, in the following detailed description, this intended that combinations of distinguished lists may be used whenever a single distinguished list is stipulated.

Referring to FIG. 1, the first step (1) in the present invention is to cause the input device to accept from the operator the first character. This first character is stored in the character variable, X.

In the next step (2), a phrase is constructed from the character stored in X. This phrase is stored in the string variable, USERSTG.

In the next step (3), the character which is stored in the variable, X is used to identify a primary distinguished list, called X-list, from among all of the distinguished lists.

In the next step (4) a select list called SL is formed from the X-list. This is done by projecting from the X-list all phrases whose prefix is the same as the phrase which is stored in the variable USERSTG. When this step is first encountered, after step (2), USERSTG consists of merely the character that is stored in the variable X, namely, that character which was first inputted by the operator; therefore, when this step is first encountered, it involves selecting all phrases on the X-list which begin with the character stored in the variable X. Subsequently, when this step is encountered by transfer to control point A (5), the variable USERSTG will have been lengthened by appending e.g., concatenating of subsequent characters inputted by the operator to the variable, so the projection from the X-list will not necessarily select every phrase on the X-list.

In the next step (6), the select list SL is tested to determine if it is empty. If the outcome of said test is "not empty" then the flow of control proceeds along the path labeled "not empty" (7) and the next step is illustrated in (9). If the outcome of said test is "empty" then the flow of control proceeds along the path labeled "empty" (8) and the next step is illustrated in (20).

In step (9), which follows after the "not empty" path (7) is taken from step (6), the process presents to the operator the first and subsequent phrases which are on the select list, SL. In this step, we mean to include all methods of presentation, whether audio or visual, whether partial or complete, whether continuous or interrupted. We further mean to include methods which present information upon a video display terminal in a so-called "window" distinguished from surrounding context. We further mean to include methods which involve further interaction with the operator, such as "scrolling" the information in response to signals from the operator. For instance, such interaction would be useful if the number of phrases to be presented to the operator exceeds the number which can be conveniently displayed at one time on a video display terminal.

In step (10), which follows after step (9), the process distinguishes the prefix USERSTG from the remainder of the phrases in SL. We note that the present invention arranges and defines SL such that USERSTG is a prefix of each of the phrases in SL. Said prefix may be distinguished by underlining, or by any other method which is suitable for the presentation device that is utilized. For instance, with a video display terminal, said prefix could be distinguished by causing it to blink on the video display terminal, or by altering its intensity, or by presenting it in an italic font.

In step (11), which follows after step (10), either the operator provides a further input character (12), or the operator indicates by a signal (13) that the process should proceed to step (17) for further processing. For instance, such a signal may be the depressing of one of some designated set of keys on the terminal keyboard, such as the "Enter" key or the "Shift" key.

If the operator provides a further input character (12), then the process proceeds to step (14) where it accepts said input character from the operator and stores it in the variable Y.

In step (15), which follows after step (14), the phrase stored in USERSTG is extended by appending the character stored in Y.

In step (16), which follows after step (15), the process returns again via the control point A (5) to step (4).

In step (17), which follows after the "signal" path (13) is taken from step (11), the process notes which phrase, P, that the operator chooses to accept. This step may require additional input from the operator. For instance, if the displayed list, SL, contains five phrases, then the operator may be required to select one of the five by inputting a signal, such as by inputting one of the numbers 1, 2, 3, 4, or 5.

In step (18), which follows after step (17), the process optionally rearranges the data stored in its memory means. This rearrangement is performed upon the distinguished X-list which is distinguished by the character stored in X, which is the character first inputted by the operator. The X-list is rearranged so that the chosen phrase, P, is moved closer to the front. As those skilled in the art of programming will readily appreciate, this rearrangement may be accomplished in many ways, including the "move-to-the-front rule" or the "move-toward-the-front rule" or the "exchange-with-the-front rule". It is not necessary that the rearrangement be completed in step (18), but said rearrangement may be postponed until such time as the process again requires the use of the distinguished X-list in step (4).

We refer now to step (20), which follows after the "empty" path (8) is taken from step (6). When the process has reached this step, it has recognized that the phrase stored in USERSTG is not a prefix of any of the phrases on the list SL, and consequently USERSTG is not a prefix of any of the phrases on the distinguished X-list. The process presents to the operator the phrase stored in USERSTG. As in step (9), we mean to include all methods of presentation.

In step (21), which follows after step (20), either the operator provides a further input character (22), or the operator indicates by a signal (23) that the process should proceed to step (27) for further processing. As in step (13) an example of such a signal is the depressing of one of some designated set of keys on the terminal keyboard, such as the "Enter" key or the "Shift" key.

If the operator provides a further input character (22), then the process proceeds to step (24) where it accepts said input character from the operator and stores it in the variable Y.

In step (25), which follows after step (24), the phrase stored in USERSTG is extended by appending the character stored in Y.

In step (26), which follows after step (25), the process returns again via the control point B (19) to step (20).

In step (27), which follows after the signal path (23) is taken from step (21), the process notes that the operator has completed the input of the phrase stored in USERSTG. In this step, the process rearranges the data stored in its memory means. This rearrangement is performed upon the distinguished X-list. The X-list is rearranged so that the phrase, USERSTG, is inserted into the X-list. The phrase USERSTG may be inserted either at the front of the X-list, or at the rear of the X-list, or anywhere in between. It is not necessary that the insertion be completed in step (27), but said insertion may be postponed until such time as the process again requires the use of the distinguished X-list in step (4).

As those in the art will appreciate, any conventional general purpose data processor may be used to practice this invention. For instance, an IBM Personal Computer having a 128K memory, a keyboard, and a video display terminal comprises one such type of conventional computer configuration. Furthermore, the data gathering/storing/displaying software of this invention may be written in any conventional programming language such as COBOL, FORTRAN, PASCAL, C, etc., and/or actual machine level or assembly level languages adapted to particular computers. For instance, an appropriate IBM Assembly Language for the IBM Personal Computer previously mentioned is described in various IBM publications available through the IBM Corporation. Using this language designed for the IBM Personal Computer, the flow charts shown in the figures may be readily reduced to an actual program as will be appreciated.

Of course, if higher level programming languages are used fewer separate program instructions may be necessary to implement the program segments a will be appreciated.

Although only one exemplary embodiment of this invention has been described in detail, those skilled in the art will readily appreciate that many modifications of the exemplary method are possible without materially changing the structure of the resulting process or machine. Accordingly, all such modifications ar intended to be included within the scope of this invention.

What is claimed is:

1. A method for operating data processing apparatus, the apparatus having input means for receiving signals indicative of data characters and control commands, memory and output means for transmitting data to an operator comprising the steps of:
   (a) storing in the memory means a plurality of distinguished lists of data phrases ordered in each list according to a prioritizing scheme based upon usage and each data phrase consisting of concatenated data characters;
   (b) receiving a first operator input via the input means and, if the input is a data character, then setting a user string equal to said data character and storing said user string in the memory means;
      (i) substantially simultaneously selecting from said plurality of distinguished lists a corresponding primary distinguished list containing data phrases having the same prefix as the data character inputted by the operator;
      (ii) substantially simultaneously selecting from said primary distinguished list a select list of data phrases having prefixes that match said user string with said select list being ordered in accordance with said prioritizing scheme based upon usage;
      (iii) substantially simultaneously displaying, via the output means, said user string and a predetermined number of the data phrases of said select list;
   (c) while continuously displaying said user string and said predetermined number of said data phrases of said select list, receiving further operator input via the input means and if said further operator input is a data character;
      (i) then concatenating said data character to said user string, thereby forming a new user string; and
      (ii) substantially simultaneously selecting from said primary distinguished list a new select list of data phrases having prefixes that match said new user string with said new select list being ordered in accordance with said prioritizing scheme based upon usage; and
      (iii) substantially simultaneously displaying, via the output means, said new user string and a predetermined number of the data phrases of said new select list;
   (d) repeating step (c) unless the operator input is a control command indicating a desired phrase is among the phrases being displayed and indicating also which of the phrases being displayed is the desired phrase.

2. A method as claimed in claim 1, wherein the data phrases of a distinguished list all have the same single data character prefix, and wherein said step of receiving said first operator input includes the step of selecting from said plurality of distinguished lists a primary distinguished list containing data phrases that have as prefixes the first data character inputted by the operator; and
   wherein for each data character that is further inputted by the operator, said step of selecting a new select list from the memory means includes the step of selecting said new select list from said primary distinguished list.

3. A method as in claim 2, further comprising the step of: rearranging the data stored in the memory means so that said primary distinguished list maybe easily reconstructed so that those phrases which are more likely to be said desired phrase are nearer the front of said primary distinguished list and those phrases which are less likely to be said desired phrase are nearer the rear of said primary distinguished list.

4. A method as claimed in claim 1, further comprising the step of rearranging the data stored in the memory means according to a prioritizing scheme based upon usage so that those phrases which have more usage are nearer the fronts of said distinguished lists and those phrases which have less usage are nearer the rears of said distinguished lists.

5. A method as claimed in claim 4, wherein the step of rearranging the data stored in the memory means after receiving said control command indicating that said desired phrase is in said displayed select list, is effected by a control command indicating which of said select phrases is said desired phrase, and moving said desired phrase nearer to the front of the corresponding primary distinguished list in the memory means.

6. A method as claimed in claim 1, further comprising the steps of determining, after the step of selecting a select list, whether said select list is empty, and indicating that determination to the operator via the output means.

7. A method as claimed in claim 6, wherein the data processing apparatus is operated to additionally record data, and wherein the method further comprises the steps of:
continuously receiving further input from the operator after indicating to the operator that the select list is empty, if said input is a data character, then concatenating said data character to the user string thereby forming a new user string;
substantially simultaneously displaying, via the output means, said new user string; and
if said input is a control command indicating that the new user string is complete, then recording said user string in the corresponding primary distinguished list in the memory means according to a prioritizing scheme based on usage.

8. A method as claimed in claim 7, wherein said completed new user string is recorded in the corresponding primary distinguished list in the memory means by inserting said completed new user string at the front of said corresponding primary distinguished list in the memory means.

9. A method as claimed in claim 1, wherein for each data character that is further inputted by the operator, said step of selecting the select list from said primary distinguished list includes the step of selecting said select list from the previously selected select list, thereby forming a new select list.

10. A method as claimed in claim 1, further comprising the steps of displaying all select phrases by displaying said select phrases in order of priority, with the higher priority phrases displayed first and with the lower priority phrases displayed subsequently.

11. A method as claimed in claim 1, further comprising the step of displaying said select phrases in such a way that distinguishes the user string prefix from the remainder of said select phrases.

12. A data processing apparatus under programmed control, said apparatus having:
input means for receiving signals indicative of data characters and control commands;
memory means for storing a plurality of distinguished lists of data phrases and for storing a user string, the data phrases being comprised of concatenated data characters, the user string corresponding to at least a portion of a concatenation of data characters that defines a desired data phrase, each distinguished list being comprised of data phrases that have the same single data character prefix, each distinguished list being ordered according to a prioritizing scheme based upon usage;
output means for transmitting data to an operator, for selecting and displaying data dependent upon data inputted by an operator and the contents of the memory means of said apparatus comprising:
means for receiving first operator input via the input means, if the input is a data character, then setting the user string equal to said data character; and
selecting means for substantially simultaneously selecting from said plurality of said distinguished lists a corresponding primary distinguished list comprising data phrases that have as prefixes the first data character inputted by the operator; and
matching means for substantially simultaneously selecting from said corresponding primary distinguished list anew select list of select phrases having prefixes that match said user string and an order that is in accordance with said prioritizing scheme based upon usage; and
means for receiving further operator input via the input means, if the input is a data character, then concatenating the data character to the user string, thereby forming a new user string;
displaying means for substantially simultaneously displaying, via the output means, said user string and a predetermined number of the data phrases of said select list, and
means for detecting a control command that is inputted by the operator indicating that the desired phrase is among the phrases being displayed and for indicating which of the phrases being displayed is the desired phrase.

13. An apparatus as in claim 12, further comprising: means for rearranging the data stored in the memory means so that said primary distinguished list may be easily reconstructed so that those phrases which are more likely to be said desired phrase are nearer the front of said primary distinguished list and those phrases which are less likely to be said desired phrase are nearer the rear of said primary distinguished list.

14. An apparatus as claimed in claim 12, further comprising means for rearranging the data stored in the memory means according to a prioritizing scheme based upon usage so that said primary distinguished lists may be easily reconstructed so that those phrases which have a higher usage are nearer the fronts of said primary distinguished lists and those phrases which have lower usage are nearer the rears of said primary distinguished lists.

15. An apparatus as claimed in claim 14 further comprising:
means for rearranging the data stored in the memory means after receiving said control command indicating that said desired phrase is in said displayed select list, including:
means for receiving a control command indicating which of said select phrases is said desired phrase; and
means for moving said desired phrase nearer to the front of the corresponding primary distinguished list in the memory means.

16. An apparatus as claimed in claim 12, further comprising means for determining, after the step of selecting a select list, whether said select list is empty, and indicating that determination to the operator via the output means.

17. An apparatus as claimed in claim 16, further used for recording data, the apparatus further comprising:
   means for continuously receiving further input from the operator after indicating to the operator that the select list is empty;
   means for concatenating said input to the user string thereby forming a new user string, if said input is a data character;
   displaying means for substantially simultaneously displaying, via the output means, said new user string; and
   means for recording said user string in the corresponding primary distinguished list in the memory means according to a prioritizing scheme based upon usage if said input is a control command indicating that the user string is complete.

18. An apparatus as claimed in claim 17, further comprising means for recording said completed user string in the corresponding primary distinguished list in the memory means by inserting said user string at the front of the corresponding primary distinguished list in the memory means.

19. An apparatus as claimed in claim 12, wherein said matching means includes means for selecting a new select list from the previous select list, said new select list being ordered in accordance with said prioritizing scheme based upon usage.

20. An apparatus as claimed in claim 12, further comprising means for displaying all select phrases by displaying the phrases in order or priority, with the higher priority phrases displayed first and with the lower priority phrases displayed subsequently.

21. An apparatus as claimed in claim 12, further comprising means for choosing one of the displayed select phrases, dependent upon data further inputted by the operator.

22. An apparatus as claimed in claim 12, further comprising means for displaying said select phrases in such a way that distinguishes the user string prefix from the remainder of the said select phrases.

* * * * *